(12) United States Patent
Torres San Juan et al.

(10) Patent No.: US 10,785,986 B2
(45) Date of Patent: Sep. 29, 2020

(54) BLOOM-RESISTANT BARRIER FOOD PACKAGING

(71) Applicant: DAWN FOOD PRODUCTS, INC., Jackson, MI (US)

(72) Inventors: Julio Alberto Torres San Juan, Denver, CO (US); Jane L. Kutner, Denver, CO (US); Juan Gabriel Gonzalez Juarez, Guadalupe (MX); Miles Elton Jones, Clarklake, MI (US); Rolando Jesus Alanis Villarreal, Guadalupe (MX)

(73) Assignee: Dawn Food Products, Inc., Jackson, MI (US)

( * ) Notice: Subject to any disclaimer, the term of this patent is extended or adjusted under 35 U.S.C. 154(b) by 570 days.

(21) Appl. No.: 14/652,350

(22) PCT Filed: Dec. 20, 2013

(86) PCT No.: PCT/US2013/076859
§ 371 (c)(1),
(2) Date: Jun. 15, 2015

(87) PCT Pub. No.: WO2014/100562
PCT Pub. Date: Jun. 26, 2014

(65) Prior Publication Data
US 2015/0296810 A1    Oct. 22, 2015

Related U.S. Application Data

(60) Provisional application No. 61/740,747, filed on Dec. 21, 2012.

(51) Int. Cl.
| | | |
|---|---|---|
| *A21D 15/02* | (2006.01) | |
| *A23L 3/36* | (2006.01) | |
| *A21D 13/60* | (2017.01) | |
| *A21D 13/80* | (2017.01) | |

(52) U.S. Cl.
CPC .............. *A21D 15/02* (2013.01); *A21D 13/60* (2017.01); *A21D 13/80* (2017.01); *A23L 3/364* (2013.01)

(58) Field of Classification Search
CPC ........ A21D 15/02; A21D 13/80; A21D 13/60; A21D 6/001; A23L 3/364; A23L 3/36; A23L 3/362
See application file for complete search history.

(56) References Cited

U.S. PATENT DOCUMENTS

| | | | |
|---|---|---|---|
| 4,991,403 A | 2/1991 | Kirchhoff | |
| 7,771,766 B2 * | 8/2010 | Kouno | ........... A21D 15/02 426/444 |
| 9,861,107 B2 | 1/2018 | Zhong et al. | |
| 2006/0263494 A1 | 11/2006 | Geng et al. | |
| 2006/0286241 A1 * | 12/2006 | Krinski | ............ A23J 3/16 426/549 |
| 2007/0110867 A1 | 5/2007 | Kouno et al. | |
| 2010/0310749 A1 * | 12/2010 | Cristadoro | ........... A21D 2/16 426/553 |
| 2011/0236537 A1 | 9/2011 | Zhong et al. | |

FOREIGN PATENT DOCUMENTS

| | | | |
|---|---|---|---|
| CA | 715024 | 8/1965 | |
| CA | 2611318 C | 9/2008 | |
| CA | 2760033 A1 | 6/2012 | |
| EP | 1900281 A1 | 3/2008 | |
| EP | 2258199 A1 | 12/2010 | |
| GB | 464694 A * | 4/1937 | .......... A23L 3/3418 |
| GB | 1506677 | 4/1978 | |
| KR | 20030094987 A * | 12/2003 | |
| WO | 2010/068575 A1 | 6/2010 | |

OTHER PUBLICATIONS

Evans, Judith A., "Frozen Food Science and Technology" 2008 Blackwell Publishing, p. 224-225.*
Yam, Kit L., et al. "Frozen Food Packaging." 2004 Marcel Dekker.*
PolyPrint: Water Vapor Transmission Rate http://web.archive.org/web/20110924085719/http://www.polyprint.com/flexographic-wvtr.htm (Year: 2011).*
Hui, Y.H. "Handbook of Food Science, Technology and Engineering" 2005 Taylor & Francis Group, p. 133-1 to 133-7 (Year: 2005).*
"G & F Systems" Aug. 6, 2005 http://web.archive.org/web/20050806002046/http://www.gfsystems.com/Products/ (Year: 2005).*
Extended European Search Report for EP Application No. 13863737. 6, completed Apr. 25, 2016.
P.J. Fellows, 2009, Chapter 25: Packaging in *Food Science, Technology and Nutrition: Food Processing Technologies: Principles and Practice (3rd Edition)*, Woodhead Publishing Series, pp. 713-774.
Cleland et al, 1997, Prediction of Freezing Time and Design of Food Freezers in *Handbook of Food Engineering Practice*, CRC Press, p. 73-121.
International Search Report and Written Opinion, International Application No. PCT/US2013/076859, completed Mar. 19, 2014.
Khurmi et al., "A Textbook of Refrigeration and Air conditioning (Multicolor Edition)," Jan. 1, 2008, [retrieved Mar. 17, 2014], available at http://books.google.com/books?id=4vhP2jXJ3HEC&pg=PA417&lpg=PA417&dq=method+slow+freezing+food+products&source+bl&ots+Kgs1HIcYYD&sig=-EzHaWdLAycy5_uE0CC07ujEHpM&hl=en&sa=X&ei=94goU6riG4_moASSnYCAAw&ved+0CEcQ6AEwBQ#v=onepage&q&f=false, paragraph 13.10(1) [Book reference available upon Examiners request].

* cited by examiner

*Primary Examiner* — Viren A Thakur
(74) *Attorney, Agent, or Firm* — Barnes & Thornburg LLP

(57) ABSTRACT

A bloom-resistant method of freezing and packaging a fresh food product.

11 Claims, 2 Drawing Sheets

BLOOM-RESISTANT BARRIER FOOD PACKAGING

CROSS-REFERENCE TO RELATED APPLICATIONS

This application is a national stage entry under 35 USC § 371(b) of PCT International Application No. PCT/US2013/076859, filed Dec. 20, 2013, and claims priority under 35 U.S.C. § 119(e) to U.S. Provisional Application Ser. No. 61/740,747 filed Dec. 21, 2012. The disclosures of which are incorporated herein by reference.

TECHNICAL FIELD

The present disclosure relates to methods of freezing and packaging frozen food products to inhibit moisture migration and bloom formation.

BACKGROUND

Blooms on frozen food products, and in particular, frozen frosted bakery products appear as white eruptions on the surface of the food. This disclosure is directed to address this problem and particularly relates to methods for inhibiting bloom formation and moisture migration in frozen frosted bakery products. More specifically, the disclosure relates to methods of freezing a fresh food product and packaging a frozen food product within a protective packaging material to inhibit bloom. The resulting inhibition of moisture migration and bloom formation extends the food product's shelf life and enhances the commercial value of bakery products.

BRIEF DESCRIPTION OF THE DRAWINGS

The present disclosure will now be described by way of example in greater detail with reference to the attached figures, in which.

DETAILED DESCRIPTION OF THE INVENTION

Figure 1:
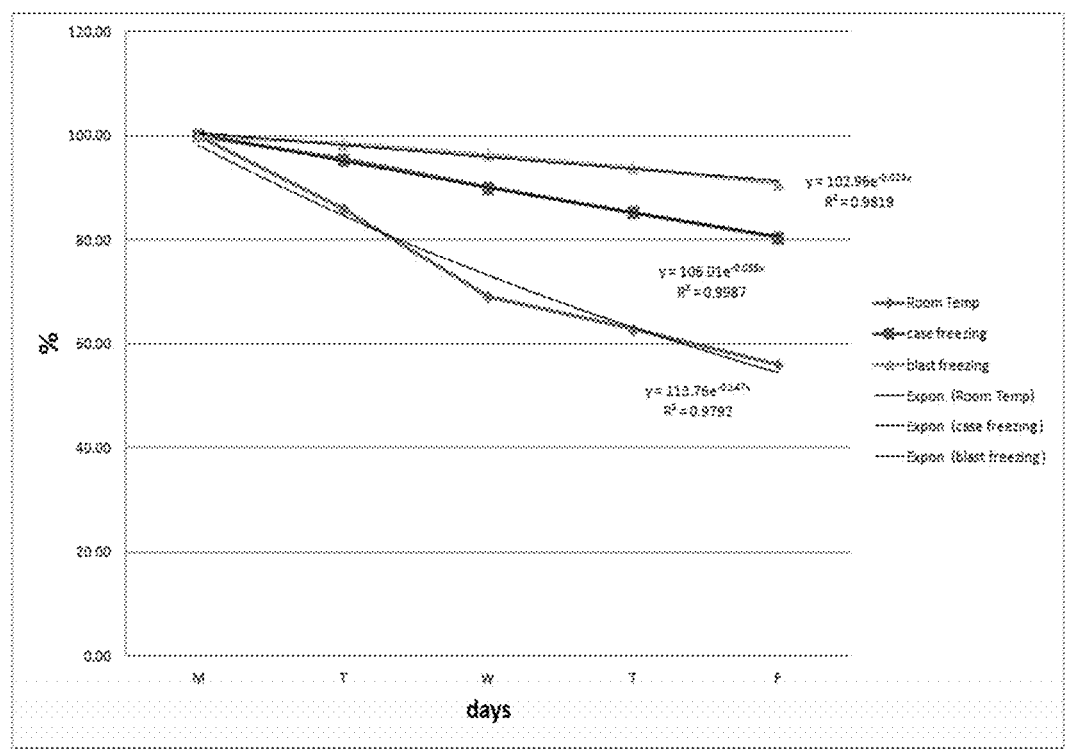
FIG. 1 is a graph that shows the moisture loss of fresh and frozen frosted yeast doughnuts under different atmospheric conditions.

Bloom formation in frozen foods is primarily due to moisture migration into or out of the food product. Moisture migration in frozen foods may occur when a temperature gradient is created within the food product, often due to the freezing process. Moisture migration in frozen food products manifests in several forms including moisture loss by sublimation, moisture absorption and redistribution in food components, or recrystallization of ice due to drip loss during thawing.

In the case of frozen food products, blooming primarily occurs as the result of moisture migrating between different components of the frozen food product or between the frozen food product and the atmosphere. For example, in a frozen frosted bakery product such as a frozen frosted yeast doughnut, moisture can migrate from the doughnut to the frosting to produce bloom formation on the surface of the frosting. While the blooms do not create any health risk or significantly influence the taste or texture of the bakery product, their appearance tends to make the product unappetizing.

Similarly, temperature fluctuations created by the freezing or storage process can result in moisture migration between a frozen food product and the atmosphere. When the atmospheric temperatures decrease, moisture within the frozen food product migrates toward its surface or into the atmosphere. Conversely, when environmental or atmospheric temperatures increase, moisture can migrate toward and be absorbed into the frozen food product surface without protective packaging to prevent moisture migration, the moisture in the frozen food product and the moisture in the atmosphere will equilibrate causing hydration of, for example, sugar crystals resulting in bloom.

As indicated above, frozen frosted bakery goods can be affected by relative humidity of their environmental surroundings, water activity within the food product, and moisture content which are major factors in determining the shelf life longevity and propensity for bloom formation of a food product. For example, the relative humidity of a food production environment is the amount of water vapor in the air compared to the amount of water required to saturate the air at a particular temperature or water vapor pressure. When the water vapor and temperature of the air in a food production or handling facility are at equilibrium with the water vapor and temperature of the food products contained therein, the Equilibrium Relative Humidity has been reached. The Equilibrium Relative Humidity (ERH) can be described as a percentage, but is most often expressed as a fraction or a decimal number.

When applied to food products and packaging, the Water Activity is the ratio of water vapor pressure of a food product to the water vapor pressure of pure water under the same conditions. The Water Activity ($A_w$) is often expressed as a fraction or decimal number ranging from 0.0 (bone dry) to 1.0 (pure water). The higher the $A_w$ of a food product, the more likely mold and microorganisms will develop on or within the product. Therefore, the FDA has established a maximum 0.85 $A_w$ parameter for shelf-safe bakery products. The Water Activity of a food product is also equal to the Equilibrium Relative Humidity (ERH) of air surrounding the food product in a sealed chamber. Thus, a food product with a water activity of 0.8 would also have an Equilibrium Relative Humidity of 0.8 or 80%.

The moisture content which relates to the Water Vapor Transmission Rate of a food product is the measure of the passage of moisture or water vapor through the food product at a specified condition of temperature and relative humidity. Therefore, the lower the Water Vapor Transmission Rate (WVTR), the greater the protection against moisture migration. The WVTR of a food product is defined by the quotient of the average moisture loss per day (M) in grams (g) divided by the product of the surface area of the food product (FSA) in meters squared ($m^2$) and the number of days tested (#), as shown:

$$WVTR = M(g)/[FSA(m^2) * \# \text{ of Days tested}]$$

The Water Flux of a food product is the rate of water flow per unit area of the food product and is dependent on the WVTR. In fact, the Water Flux (WFlux) is defined by the product of the WVTR, the surface area of a primary packaging container (PSA), and the difference in Equilibrium Relative Humidity (ERH), as shown:

$$WFlux = WVTR * PSA * (ERH1 - ERH2)$$

Once known, the water flux of a particular food product may help determine and/or predict the timeframe for total loss of water content, expectation of bloom formation, and the shelf life longevity of the product. Further, when the water flux of a food product is known, it may be applied to select a food product packaging material that will protect the food product from moisture migration. To have a protective effect against moisture migration, the selected packaging material must have a close or lower water flux than the water flux of the food product.

While it should be understood that the invention disclosed herein may be used with any bakery product which will benefit from the contents of this disclosure, the following discussion is directed to yeast doughnuts. In particular, to show the application of the WVTR and WFlux on product packaging selection in order to protect food products from moisture migration, yeast doughnuts were produced, frosted, and sealed within a primary packaging container that had a primary surface area (PSA). The primary package of doughnuts was transported to an overwrap station and wrapped in a water vapor permeable material to create a master container. The master container was stored in a holding room or chamber having three, independent atmospheric conditions; 1) ambient or room temperature, 2) slow or case freezing, and 3) quick or blast freezing. Select doughnuts were exposed to one of the three atmospheric conditions and were weight tracked to determine their moisture loss over five days.

As previously described, primary packaging containers of fresh frosted yeast doughnuts were wrapped with a water vapor permeable material and packaged in a master container. The master container was indefinitely held in an ambient room having air temperatures that ranged from about 16° C. to about 21° C. The relative humidity of the ambient room was about 60% (i.e., 0.6 $A_w$ or ERH) and the dew point temperature was about 4° C. to about 10° C. The moisture loss of the doughnuts in the ambient room was tracked over five days.

As shown in FIG. 1, the total moisture lost from the fresh yeast doughnuts over the five-day experiment was 44%. The average moisture loss per day of the fresh frosted yeast doughnuts was 3 grams (g). The surface area of the yeast doughnuts and the primary packaging material remained constant throughout the experiment and was about 0.006 meters squared ($m^2$) and about 0.123 $m^2$, respectively. The Water Vapor Transmission Rate (WVTR) for the fresh frosted yeast doughnuts at ambient or room temperatures (RT) was determined to be 100 g/$m^2$/day according to the following:

$$WVTR_{RT}=3 \text{ g}/(0.006 \text{ m}^2*5 \text{ days})=100 \text{ g/m}^2\text{day}$$

Based on the WVTR of the yeast doughnuts at ambient temperatures, the baseline water flux of the fresh frosted yeast doughnut at any atmospheric condition was determined to be 7.38 g/day according to the following:

$$WFlux_{RT}=100 \text{ g/m}^2/\text{day}*0.123 \text{ m}^2*0.6=7.38 \text{ g/day}$$

At a moisture loss rate of 7.38 g/day, a packaged, fresh frosted yeast doughnut is expected to lose its total free water content of about 20 g within 2.7 days. Consequently, 2.7 days also defines the expected shelf life of the fresh frosted yeast doughnut at ambient conditions.

Additional fresh frosted yeast doughnuts were wrapped in a primary package and packaged in a master container. The doughnuts within the master container were held and slow-frozen in a static or case freezer whose air temperature was about −10° C. to about −20° C. and had an 80% relative humidity (i.e., 0.8 $A_w$ or ERH). The slow freezing dwell time, or time the doughnuts were held in the holding room to freeze, ranged from about 24 hours to about 48 hours. After frozen, the doughnuts were indefinitely held in the static or case freezer at the same atmospheric conditions. The moisture loss of the doughnuts was tracked over five days.

As shown in FIG. 1, the total moisture lost from the slow-frozen yeast doughnuts over the five-day experiment was 19%. The average moisture loss per day of the slow-frozen frosted yeast doughnut was 0.84 g. The surface area of the yeast doughnut remained about 0.006 $m^2$ while the surface area of the primary packaging held constant at about 0.123 $m^2$. The Water Vapor Transmission Rate (WVTR) for the slow-frozen frosted yeast doughnut (SF) was determined to be 28 g/$m^2$/day according to the following:

$$WVTR_{SF}=0.84 \text{ g}/(0.006 \text{ m}^2*5 \text{ days})=28 \text{ g/m}^2\text{day}$$

Based on the WVTR of the yeast doughnuts at slow-freezing temperatures, the water flux of the packaged, slow-frozen frosted yeast doughnut at any atmospheric condition was determined to be 2.75 g/day according to the following:

$$WFlux_{SF}=28 \text{ g/m}^2/\text{day}*0.123 \text{ m}^2*0.8=2.75 \text{ g/day}$$

At a moisture loss rate of 2.75 g/day, a slow-frozen frosted yeast doughnut is expected to lose its total free water content of 20 g within 7.3 days. Consequently, 7.3 days also could define the expected shelf life of the slow frozen frosted yeast doughnut.

A final group of fresh frosted yeast doughnuts were individually frozen in a blast spiral freezer. The blast spiral freezer had an air temperature of about −17° C. to about −34° C. and a relative humidity of 80% (i.e., 0.8 $A_w$ or ERH). The blast freezing dwell time was about 15 minutes to about 45 minutes. The individual frozen frosted yeast doughnuts were then packaged in primary packages. Primary packages comprise variable sizes to accommodate different numbers of doughnuts. For example, primary packages to house a single, few, or a half dozen doughnuts had significantly smaller surface areas than primary packages built to house a couple dozens, several dozens, or hundreds of doughnuts The primary packages were each wrapped in water-vapor permeable material to create a master container. After quick freezing and packaging, the doughnuts within the master container were held in a static freezer. The static freezer had a temperature of about −10° C. to about −20° C. and a relative humidity of 80% (i.e., 0.8 $A_w$ or ERH). The moisture loss of the doughnuts was tracked over five days.

Referring back to FIG. 1, the total moisture lost from the quick-frozen yeast doughnuts over the five-day experiment was 9%. The average moisture loss per day of the quick-frozen frosted yeast doughnut was 0.09 g. The surface area of the yeast doughnut was held constant at about 0.006 $m^2$ while the surface area of the primary packaging remained 0.123 $m^2$. The Water Vapor Transmission Rate (WVTR) for the quick-frozen frosted yeast doughnut (QF) at room temperature was determined to be 3 g/$m^2$/day according to the following:

$$WVTR_{QF}=0.09 \text{ g}/(0.006 \text{ m}^2*5 \text{ days})=3 \text{ g/m}^2\text{day}$$

Based on the WVTR of the yeast doughnuts at quick-freezing temperatures, the water flux of the packaged, quick-frozen frosted yeast doughnut at any atmospheric condition was determined to be 2.75 g/day according to the following:

$$WFlux_{QF}=3 \text{ g/m}^2/\text{day}*0.123 \text{ m}^2*0.8=0.30 \text{ g/day}$$

At a moisture loss rate of 0.3 g/day, a quick-frozen frosted yeast doughnut is expected to lose its total free water content of 20 g within 66.6 days. Consequently, 66.6 days also could define the expected shelf life of the quick-frozen frosted yeast doughnut.

As FIG. 1 shows, slow- or quick-freezing the fresh frosted yeast doughnuts, reduces the moisture lost from the doughnuts over a time course of five days. In fact, the daily moisture loss was reduced by 35%; from 7.38 g/day in the fresh doughnuts held at ambient temperatures, down to 2.75 g/day when the doughnuts were slow-frozen, to as low as 0.3 g/day when the doughnuts were quick-frozen. Thus, FIG. 1 shows that change in atmospheric and/or environmental conditions, such as temperature and humidity, have a significant inhibitory effect on the moisture migration (e.g., moisture loss) from food products such as, frozen frosted yeast doughnuts. More specifically, decreasing the short- and/or long-term holding temperatures of yeast doughnuts, even when the relative humidity is increased (e.g., from 60% at ambient temperatures to 80% at freezing temperatures), has a significant inhibitory affect on food product moisture migration that should also play a role in inhibiting bloom formation.

As illustrated below the water flux of frozen frosted yeast doughnuts held at slow-freezing and quick-freezing environmental conditions was determined. The doughnut's water flux was then applied to the selection of specific packaging materials.

ILLUSTRATIVE EXAMPLES

With respect to the selection of product packaging for the protection of food products from bloom formation, yeast doughnuts were produced, frosted, frozen, and sealed within a primary packaging container. All yeast doughnuts (YD) used in Examples 1-3 had a water vapor transmission rate (WVTR$_{YD}$) of about 1 g/m$^2$/day to about 30 g/m$^2$/day and a water flux (WFlux$_{YD}$) of about 0.1 g/day to about 3 g/day.

Multiple primary packages of doughnuts were collectively wrapped in water vapor permeable packaging materials to create a master container. For example, Packaging Material 1 (P1) was water vapor permeable and had a WVTR (WVTR$_{P1}$) of about 200 g/m2/day to about 800 g/m2/day and a Water Flux (WFlux$_{P1}$) of about 60 g/day to about 80 g/day. Packaging Material 2 (P2) was water vapor permeable and had a WVTR (WVTR$_{P2}$) of about 20 g/m2/day to about 60 g/m2/day and a Water Flux (WFlux$_{P2}$) of about 1 g/day to about 7 g/day.

Doughnuts in the primary package were wrapped and further packaged into a master container. A master container of doughnuts was stored in a holding room or chamber and exposed to one of two atmospheric conditions: 1) slow or case freezing or 2) quick or blast freezing. As previously described, both slow- and quick-freezers were maintained at about 80% relative humidity. However, slow-freezing in a static or case freezer occurred at air temperatures ranging from about −10° C. to about −20° C., while quick-freezing occurred in a blast freezer at air temperatures ranging from about −17° C. to about −34° C.

As discussed above, the occurrence of bloom on the surface of the doughnut appears as a white eruption or crystal. The bloom rate was measured using a visual timeline inspection of the doughnuts in their respective frozen process; the results were recorded.

Example 1

Figure 2:
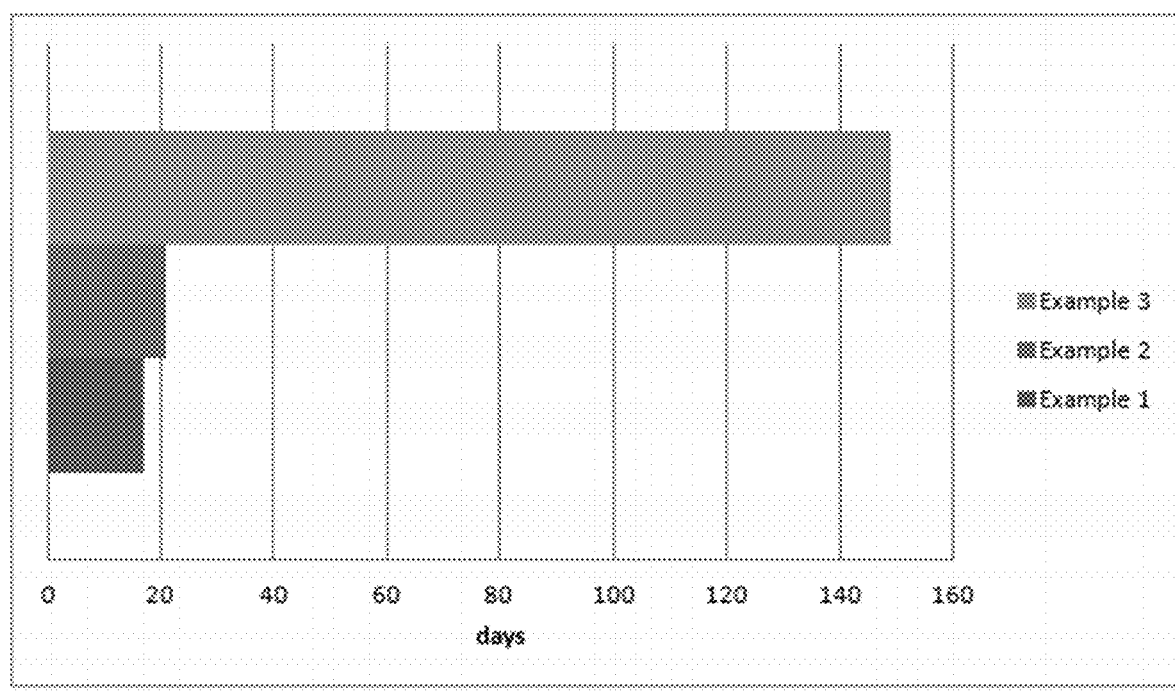
FIG. 2 is a chart that shows the time necessary for bloom formation to be observed on frozen frosted yeast doughnuts under different atmospheric conditions.

This example demonstrates that higher Water Vapor Transmission Rates (WVTR) and Water Fluxes (WFlux) of the packaging material as compared to the food product, results in shorter time until blooms are observed. Here, quick frozen yeast doughnuts (YD) contained within their primary packaging container was wrapped in a first packaging material. A first packaging material (P1) had a WVTR$_{P1}$ of about 200 g/m$^2$/day to about 800 g/m$^2$/day and a WFlux$_{P1}$ of about 40 g/day to about 80 g/day. As shown in FIG. 2, white bloom eruptions were visible on yeast doughnuts from Example 1 after about 17 days inside the static freezer.

Example 2

This example demonstrates that lower Water Vapor Transmission Rates (WVTR) and Water Fluxes (WFlux) of the packaging material as compared to the food product, results in shorter time until blooms are observed. Here, yeast doughnuts (YD) contained within their primary container were wrapped in a second packaging material and then slow-frozen, rather than quick-frozen as described in Example 1. A second packaging material (P2) had a WVTR$_{P2}$ of about 20 g/m$^2$/day to about 60 g/m$^2$/day and a WFlux$_{P2}$ of about 1 g/day to about 20 g/day.

As shown in FIG. 2, white bloom eruptions were visible on yeast doughnuts from Example 2 after about 21 days inside the static or case freezer. Thus, slow-freezing yeast doughnuts wrapped in a second packaging material that had a lower WVTR and WFlux than the first packaging material, resulted in inhibition of bloom formation for only 4 days longer than the quick frozen yeast doughnuts wrapped in the first packaging material as described in Example 1.

Example 3

This example demonstrates that lower Water Vapor Transmission Rates (WVTR) and Water Fluxes (WFlux) of the packaging material as compared to the food product, results in longer time until blooms are observed. Here, the quick frozen yeast doughnuts (YD) were packed in the primary package and wrapped in the second packaging material and then placed in the static freezer as in Example 1, rather than slow-frozen as described in Example 2. The second packaging material (P2) described in Example 2, having the same WVTR$_{P2}$ and WFlux$_{P2}$, was also used in Example 3.

As shown in FIG. 2, white bloom eruptions were visible on yeast doughnuts from Example 3 after about 149 days inside the static freezer. Therefore, quick-freezing the yeast doughnuts wrapped in P2, results in significant inhibition of bloom formation. In fact, compared to the quick-frozen yeast doughnuts wrapped in P1 (Example 1) or the slow-frozen yeast doughnuts wrapped in P2 (Example 2), quick-freezing the yeast doughnuts wrapped in P2 as described in Example 3 extended the time to bloom observation by as much as 700%-875% (see FIG. 2).

Further, FIG. 2 shows it takes 17 days until bloom observation in the Example 1 quick-frozen yeast doughnuts wrapped in P1 as compared to the 149 days until bloom observation in the Example 3 quick-frozen yeast doughnuts wrapped in P2. Accordingly, the difference in packaging material is primarily responsible for the significant difference in the anti-bloom protective effect. However, when the 21 days until bloom observation resulting from the Example 2 slow-frozen yeast doughnuts wrapped in P2 is compared to the 149 days until bloom observation of the Example 3 quick-frozen yeast doughnuts also wrapped in P2, it becomes clear that the significant inhibition of bloom formation observed in the Example 3 doughnuts is not solely attributed to the packaging material.

FIG. 2 makes clear that significant inhibition of bloom is not solely dependent on the freezing process or the packaging material, but is actually dependent on the quick-freezing process being coupled or combined with a protective packaging material, such as P2. In fact, it is only in Example 3 when both the quick-freezing process is coupled with the protective wrap of the P2 packaging material that significant protection from bloom of the yeast doughnuts is observed.

It should be appreciated that the P2 packaging material was specifically selected because its $WVTR_{P2}$ and $WFlux_{P2}$ (i.e., $WVTR_{P2}$ of about 20 g/m$^2$/day to about 60 g/m$^2$/day and its $WFlux_{P2}$ of about 1 g/day to about 20 g/day) partially overlapped and was thus, much closer to the $WVTR_{YD}$ and $WFlux_{YD}$ of the yeast doughnut (i.e., $WVTR_{YD}$ of about 1 g/m$^2$/day to about 30 g/m$^2$/day and a water flux $WFlux_{YD}$ of about 0.1 g/day to about 3 g/day) as compared to the $WVTR_{P1}$ and $WFlux_{P1}$ of the P1 packaging material (i.e., $WVTR_{P1}$ of about 200 g/m$^2$/day to about 800 g/m$^2$/day and a $WFlux_{P1}$ of about 40 g/day to about 80 g/day). This data confirms that a packaging material having a water flux whose range overlaps, is equal to, or less than the water flux of the food product to be packaged is an effective criterion to appropriately select a protective packaging material.

Further, by using water flux as a criterion to select packaging material possessing protective properties and coupling that packaging material with a quick-freezing process, significant inhibition of moisture migration and bloom formation results (see FIG. 2). The resulting protection inhibiting bloom will increase the shelf life longevity of frozen food products, such as frozen frosted yeast doughnuts, and ultimately increase their commercial retail value.

It is intended that the scope of the present methods be defined by the following claims. However, it must be understood that this disclosure may be practiced otherwise than is specifically explained and illustrated without departing from its spirit or scope. It should be understood by those skilled in the art that various alternatives to the embodiments described herein may be employed in practicing the claims without departing from the spirit and scope as defined in the following claims.

What is claimed is:

1. A freezing method for preparing bloom-resistant doughnuts, the method comprising:
   receiving doughnuts,
   first freezing the doughnuts in a spiral freezer for a dwell time of 15 minutes to 45 minutes to create frozen doughnuts, wherein the spiral freezer has an air temperature ranging from −17° C. to −34° C. and a relative humidity of 80%,
   packaging the frozen doughnuts in a primary container, wherein the water flux of the frozen doughnuts within the primary container ranges from 0.1 g/day to 3 g/day,
   wrapping multiple primary containers comprising the frozen doughnuts with a water-vapor permeable material having a water flux ranging from 1 g/day to 20 g/day,
   sealing the multiple primary containers in a master container, and
   freezing and indefinitely holding the master container in a static freezer to maintain the frozen state of the frozen doughnuts, wherein the static freezer has an air temperature ranging from −10° C. to −20° C. and a relative humidity of 80%,
   wherein the freezing method extends the time that bloom formation is observed on the frozen doughnuts compared to frozen doughnuts wrapped in the water-vapor permeable material and only frozen in a static freezer having an air temperature of −10° C. and −20° C. and a relative humidity of 80% and compared to frozen doughnuts wrapped in a second water-vapor permeable material comprising a water flux ranging from 40 g/day to 80 g/day and only frozen in a spiral freezer that has an air temperature ranging from −17° C. to −34° C. and a relative humidity of 80%.

2. The method of claim 1, wherein the doughnuts are frosted.

3. The method of claim 1, wherein the doughnuts are yeast doughnuts.

4. The method of claim 1, wherein doughnuts are cake doughnuts.

5. The method of claim 1, wherein the water-vapor permeable material has a water vapor transmission rate ranging from 20 g/m$^2$/day to 60 g/m$^2$/day.

6. The method of claim 1, wherein the water flux of the water-vapor permeable material ranges from 1 g/day to 7 g/day.

7. The method of claim 1, wherein the water flux of the frozen doughnuts is 0.3 g/day.

8. The method of claim 1, wherein the water-vapor permeable material has a water vapor transmission rate ranging from 20 g/m$^2$/day to 60 g/m$^2$/day and a water flux ranging from 1 g/day to 7 g/day.

9. The method of claim 1, wherein the frozen doughnuts have a water vapor transmission rate ranging from 1 g/m$^2$/day to 30 g/m$^2$/day.

10. The method of claim 9, wherein the water flux of the frozen doughnuts is 0.3 g/day.

11. The method of claim 1, wherein the freezing method extends the time that bloom formation is observed on the frozen doughnuts by 128 days compared to doughnuts wrapped in the water-vapor permeable material and only frozen in a static freezer having a temperature of −10° C. and −20° C. and relative humidity of 80% and extends the time that bloom formation is observed on the frozen doughnuts by 132 days compared to doughnuts wrapped in a different material comprising a water flux ranging from 40 g/day to 80 g/day and only frozen in a blast freezer under the same freezing conditions.

* * * * *